UNITED STATES PATENT OFFICE.

BYRON B. GOLDSMITH, OF NEW YORK, N. Y.

COMPOSITION OF MATTER AND PROCESS OF MAKING THE SAME.

1,168,626.      Specification of Letters Patent.      Patented Jan. 18, 1916.

No Drawing.      Application filed January 10, 1913. Serial No. 741,153.      REISSUED

*To all whom it may concern:*

Be it known that I, BYRON B. GOLDSMITH, a citizen of the United States, residing at New York city, in the county of New York and State of New York, have invented certain new and useful Improvements in Compositions of Matter and Processes of Making the Same; and I do hereby declare the following to be a full, clear, and exact description of the invention, such as will enable others skilled in the art to which it appertains to make and use the same.

My invention relates to a certain composition of matter which may be used either for molding into shapes or dissolved in an appropriate solvent as a coating or varnish, and to a certain process for producing the same. I have discovered that on heating together a phenol with the formaldehyde compound of an amin, a reaction takes place with the formation of useful products varying among themselves according to the particular phenol and amin employed. As an example: I can take ordinary phenol $C_6H_5OH$ and heat it with anhydroformaldehydeanilin. There is produced a soft resinous mass, which becomes progressively harder on further heating. Instead of using phenol and anhydroformaldehydeanilin in their natural state they can be used in solution, and by heating such solutions a condensation product can be formed. The reaction between phenol and anhydroformaldehydeanilin seems to start before heat is applied, as even in the cold if phenol is added to anhydroformaldehydeanilin, which is a solid, the entire mass liquefies. Anilin is liberated during the reaction and this can, if desired, be entirely or partly removed by suitable means at the proper stage, thus giving a harder resin. No special apparatus need be used to bring about the reaction as it takes place by heating in an open vessel.

The compound can be dissolved in proper solvents, such as acetone, and used for a varnish. The proportions in which the ingredients are mixed will vary according to the particular phenol and other ingredient used, and the most suitable proportion for each case can be best determined by experiment.

This process may be described as causing a reaction between a phenolic body and a body containing a reactive methylene group combined with a second group, which combination, by yielding the methylene group to the phenol, brings about the formation of a substance of low volatility, non-miscible with water, low in electrical conductivity, and capable of entering into solid solution in the product.

I have found that a compound having the qualities specified may be readily produced by heating together one part, by molecular weight, of carbolic acid with one part, by molecular weight, of (for instance) anhydroformaldehydeanilin. These proportions are based upon the formula for anhydroformaldehydeanilin given as $C_6H_5N=CH_2$ in the work of Dr. Hugo Erdman entitled *Anleitung Zur Darstellung Organischer Chemischer Preparate*, 1894, page 126. If the formula be assumed as $(C_6H_5N=CH_2)3$, then one molecular weight of anhydroformaldehydeanilin should be used with three molecular weights of phenol. This reaction can be carried out with the formaldehyde compounds of the amins of the fatty as well as the aromatic series. Methyl amin and anilin are the first members of each series. The formaldehyde compound of methyl amin is methylmethylene amin and the formaldehyde compound of anilin is anhydroformaldehydeanilin. I have chosen these two amins as examples to show that notwithstanding the great difference between them, methyl amin being a gas and anilin a liquid, the formaldehyde compound of each is suitable for the reaction. In the same manner I can use the formaldehyde compound of other amins such as ethyl amin, propyl amin, toluidin, xylidin, etc.

It is to be understood that in the claims wherever a phenol is called for, the expression is intended to cover not only ordinary phenol, but other phenols such as guaiacol, resorcin, alpha and beta naphthol, pyrogallol, and in fact any compound of this character which has the property of uniting with the methylene group of the compound formed by reacting upon an amin with formaldehyde. On heating the compounds formed as above described they become harder and more insoluble, and they are well adapted for molding under heat and pressure, with or without the admixture of other substances as is well understood in the art, and in fact, they can be put to all the uses which such substances have been found adapted to.

As mentioned above, any amin which is liberated during the reaction can be partly or entirely removed at the proper stage, and it is sometimes desirable to remove it and sometimes not, depending upon the properties desired in the final product. My claims for the compound are independent of the particular process used in producing it, and of whether or not the by-products (such as liberated amins) are incorporated.

I claim—

1. The process of producing an artificial resin which consists in causing a phenol to react upon a definite formaldehyde compound of an amin while heating the combined materials, and continuing the process until a definitely resinous mass is produced.

2. The process of producing an artificial resin which consists in causing carbolic acid to react upon a definite formaldehyde compound of an amin while heating the combined materials, and continuing the process until a definitely resinous mass is produced.

3. The process of producing an artificial resin which consists in causing a phenol to react upon anhydroformaldehydeanilin while heating the combined materials, and continuing the process until a definitely resinous mass is produced.

4. The process of producing an artificial resin which consists in causing carbolic acid to react upon anhydroformaldehydeanilin while heating the combined materials, and continuing the process until a definitely resinous mass is produced.

5. The process of producing an artificial resin which consists in causing a phenol to react upon anhydroformaldehydeanilin in the presence of heat, separating the anilin produced in the reaction from the remainder of the mass, and continuing the process until a definitely resinous mass is produced.

6. The process of preparing phenolic condensation products, which consists in reacting upon a phenolic body with a body containing a reactive methylene group combined with another group which after yielding the methylene group to the phenolic body engenders a substance characterized by a low degree of volatility, non-miscibility with water, low electrical conductivity, and the capacity for entering into solid solution in the product.

In testimony whereof, I affix my signature in presence of two witnesses.

BYRON B. GOLDSMITH.

Witnesses:
FRANK DREUZ,
F. J. MRAZ.